Sept. 6, 1938.  W. L. BUCHS  2,129,490

GAS CLEANER

Filed March 2, 1936

Inventor
William L. Buchs

By Albert R Henry
Attorney

Patented Sept. 6, 1938

2,129,490

UNITED STATES PATENT OFFICE 2,129,490

GAS CLEANER

William L. Buchs, Kenmore, N. Y., assignor to Fedders Manufacturing Company, Inc., Buffalo, N. Y.

Application March 2, 1936, Serial No. 66,567

3 Claims. (Cl. 183—75)

This invention relates to gas cleaning apparatus which is specially devised for use in compressed air systems.

In a majority of the numerous uses of compressed air, it is essential that the air be delivered free of foreign substances such as dirt, oil, or excess moisture, and, in response to this demand, various types of filter devices have been supplied. I have found that the usual filter pack is inadequate for critical separation of oil or moisture, which are usually entrained in the air in such a highly divided state that the filter offers but a slight resistance to their passage.

In the present invention an air cleaner is provided which includes means for causing a pressure reduction of the air and a corresponding condensation of the moisture and slight coagulation of the oil particles therein. During this favorable transition, the air is caused to be impinged on a cooled surface, upon which occurrence the water and oil are deposited, the former in a condensed state and the latter in a state of viscosity suitable to cause its adherence to the surface. The surface additionally is formed so that the deposits are continuously directed therefrom to a sump, while the air is diverted to its destination in a moisture and oil free state.

Figure 2:
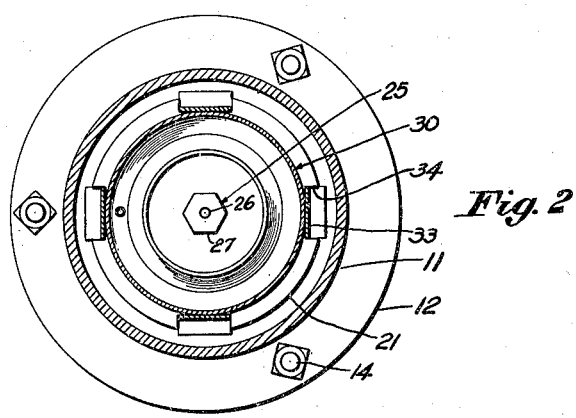
Figure 1:
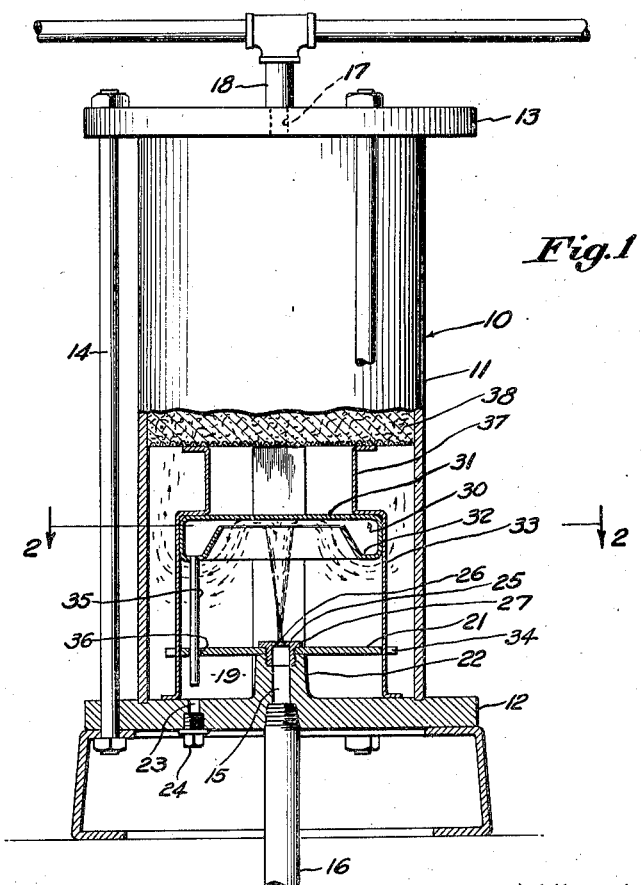

The structural features of the invention will be more readily understood by reference to the specification and accompanying drawing, wherein:

Fig. 1 is a side elevation of the air cleaner, portions of which are shown in section; and Fig. 2 is a section on the line 2—2 of Fig. 1.

For illustrative purposes the invention is shown organized with a filter casing 10, consisting of a cylindrical body 11 capped by heads 12 and 13, which are secured thereto by bolts 14. The lower head 12 is formed with a passage 15 which communicates with a supply pipe 16 leading to an air compressor or other suitable source of supply, while the head 13 is provided with an outlet passage 17 leading to a pipe 18, whence the air may be directed to the desired destination.

The lower position of the casing provides a sump 19 which is separated from the chamber of the casing by a wall member 21 which is mounted on a projection 22 in the lower head 12 through which the passage 15 extends. A drain 23 for the sump is provided in the head 12 and it is sealed by a removable plug 24. A nozzle member 25 is secured in the extremity of the projection 22 and it is formed with an orifice 26 through which the air from the pipe 16 is directed in an axial jet into the chamber. The member 25 is also formed with a head 27 which secures the member 21 to the projection 22.

I prefer the short or Borda type of orifice formation for the nozzle 25, although it will be obvious hereinafter that other types of nozzle structures may be utilized with good effect.

The cleaning element 30 is removably associated with the head 12 and it comprises a plate 31 formed with an annular trough 32, which is secured in inverted position to feet 33 which project downward and rest on the surface of the head 12. The wall member 21 is notched, as indicated by the numeral 34, to provide centering means for the feet 33 and a frictional connection between the head 12 and the element 30. A drain pipe 35 is secured to the trough 32 and it extends through a clearance hole 36 in the member 21 and into the sump chamber.

The upper extremities of the feet 33 are formed with extensions 37 for supporting a filter pack 38, if its supplemental use is found desirable.

In operation, the air ejected through the orifice 26 from the supply pipe 16 attains a considerable velocity, due to the pressure differential between the supply and delivery portions of the system, and thus it impinges directly on the intervening plate 31 of the cleaning element. During this expansive flow or jet action of the air, a slight condensation or shake-out of the entrained moisture takes place, which is immediately followed by the deposit thereof on the plate 31. Due to the continued application of the expanding air on its surfaces, the cleaning element is maintained in a relatively cooled state, in which state it is favorable for the reception of the condensates and also the oil particles which naturally cling to the cooled surface 31. Dirt particles, during this process, are trapped on the wet surface and are retained on the plate.

The formation of the cleaning element is such that after the air impinges thereon it is caused to flow symmetrically about the exterior of the annular trough 32, and thence upward through the filter pack to its destination, as indicated in Fig. 1. The heavier deposits on the plate 31 thus are forced outward by the force of the air jet and finally are directed into the trough 32 for drainage into the sump 19 through the small pipe 35. The cleaned air is prevented from recirculating about the vicinity of the jet by the wall member 21, and the close proximity of the jet opening to its flat surface, which structure discourages the formation of minor vortices about the nozzle member and the reintroduction of any substantial volumes of cleaned air into the cleaning element.

It will be apparent from the foregoing that the air cleaning principles disclosed are not limited to the precise structures illustrated, but may be embodied in various manners within the concept of the following claims.

I claim:

1. A gas cleaner comprising a housing having a chamber therein, a removable head secured to the housing and having a portion protruding into the chamber, a supply passage in said head portion, a delivery passage in the housing, a wall member secured to said head portion and providing a sump in said chamber, a plate member having a peripheral trough, feet secured to the plate member and resiliently engaging the periphery of the wall member, a nozzle in the end of the supply passage for directing a gas jet on said plate, said trough receiving the foreign matter deposited on the plate by the jet, and a pipe leading from the trough to the sump.

2. A gas cleaner comprising a housing having a chamber therein, supply and delivery passages communicating with the chamber, a nozzle in the end of the supply passage through which a gas jet is directed into the chamber, a plate mounted in the chamber and disposed transversely in the path of the jet and in spaced relation to the nozzle, said plate having a central portion adapted to be impinged by the jet and a marginal trough disposed in concentric spaced relation to the impact area of the jet, a sump chamber, and a drain leading from the trough to the sump chamber.

3. A gas cleaner comprising a housing having a chamber therein, a supply passage communicating with the lower end of the chamber, a vertical nozzle in the end of the passage for directing a vertical jet into the chamber, a gas delivery passage communicating with the chamber at a point remote from the nozzle, a plate, means for suspending the plate in the chamber transversely of the jet and in spaced relation to the nozzle, said plate having a central portion adapted to be impinged by the jet and a peripheral depending trough, said trough being spaced concentrically from the contact area of the jet, a sump chamber, and a drain leading from the trough to the sump chamber.

WILLIAM L. BUCHS.